Aug. 14, 1951     O. J. NUSSBAUM ET AL     2,564,310
MEANS FOR CONTROLLING THE HEAD PRESSURE
IN REFRIGERATING SYSTEMS
Original Filed June 20, 1947     3 Sheets-Sheet 1
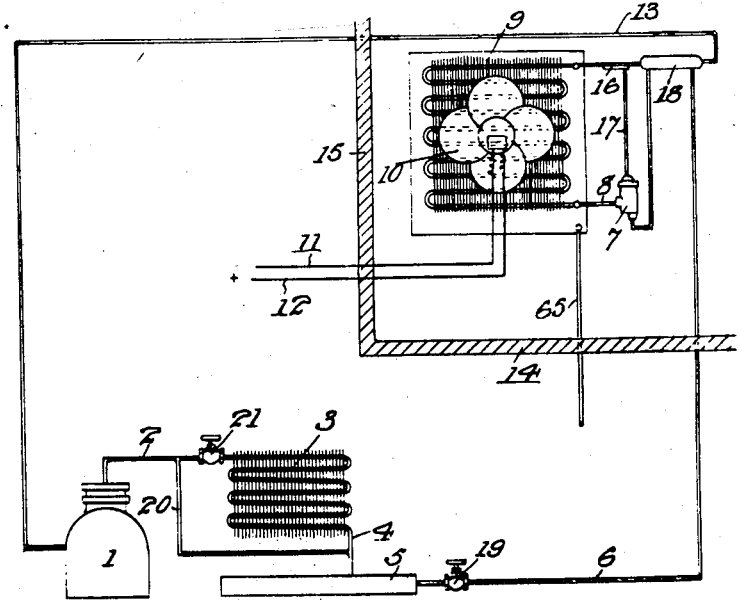
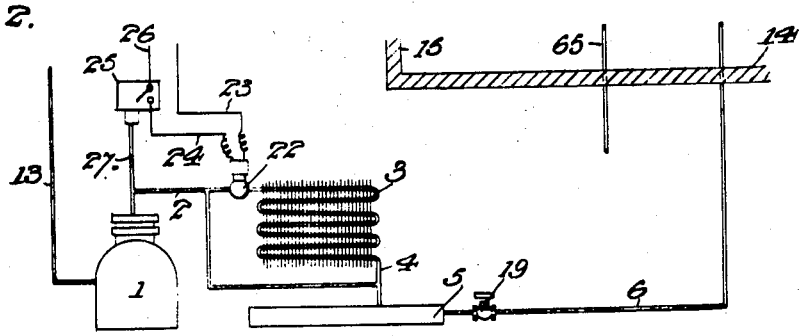
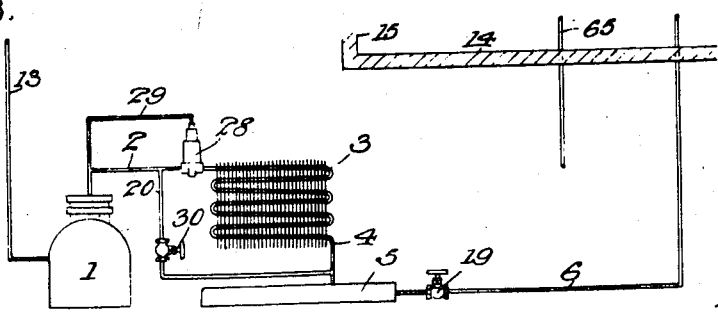

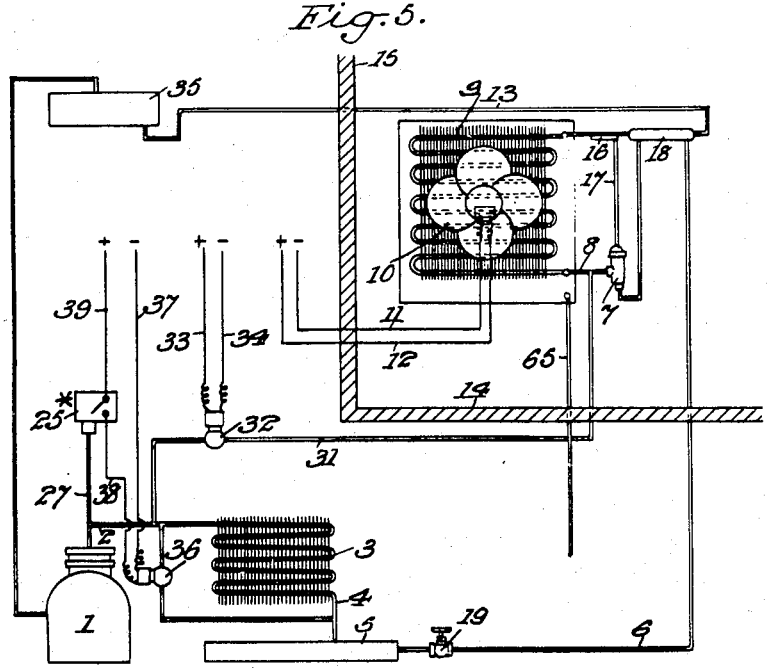
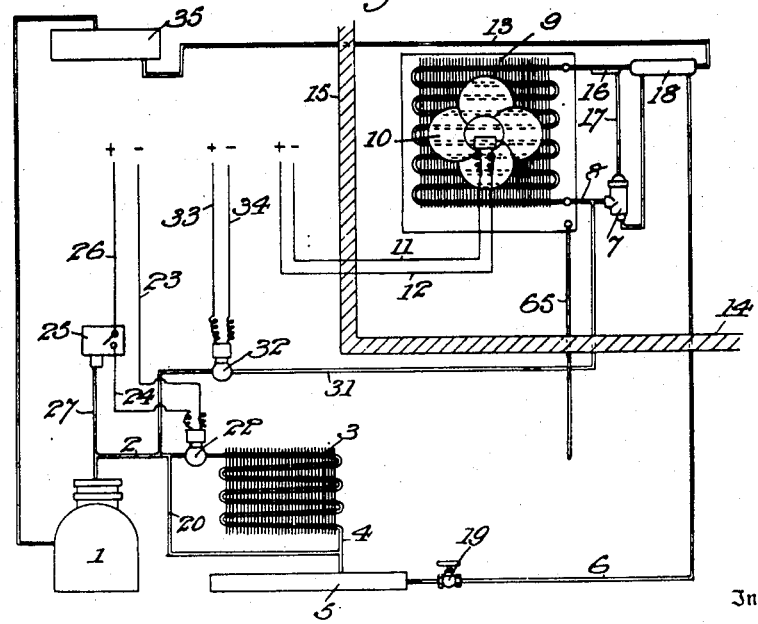

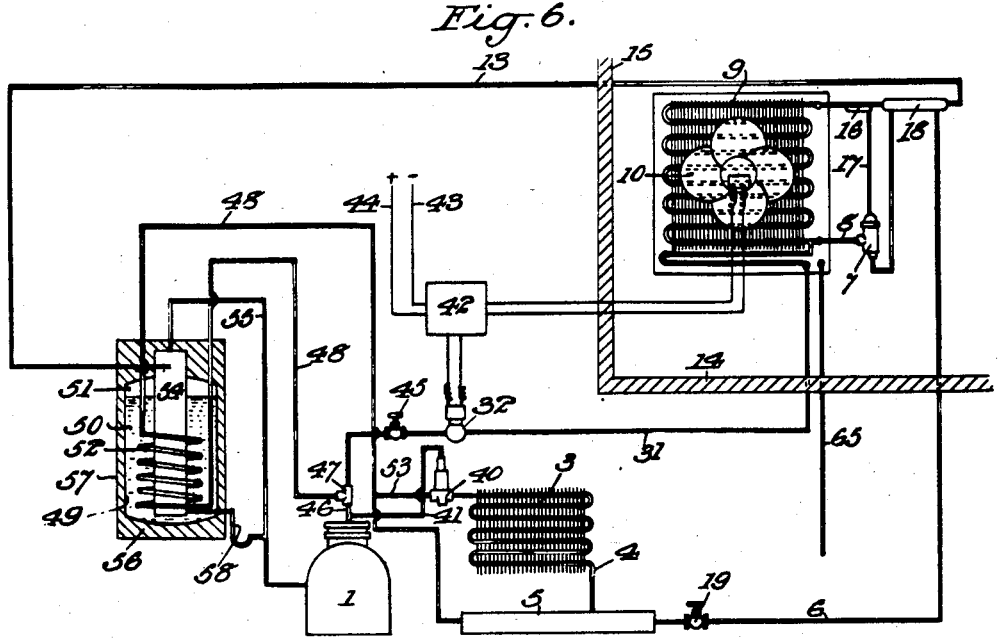
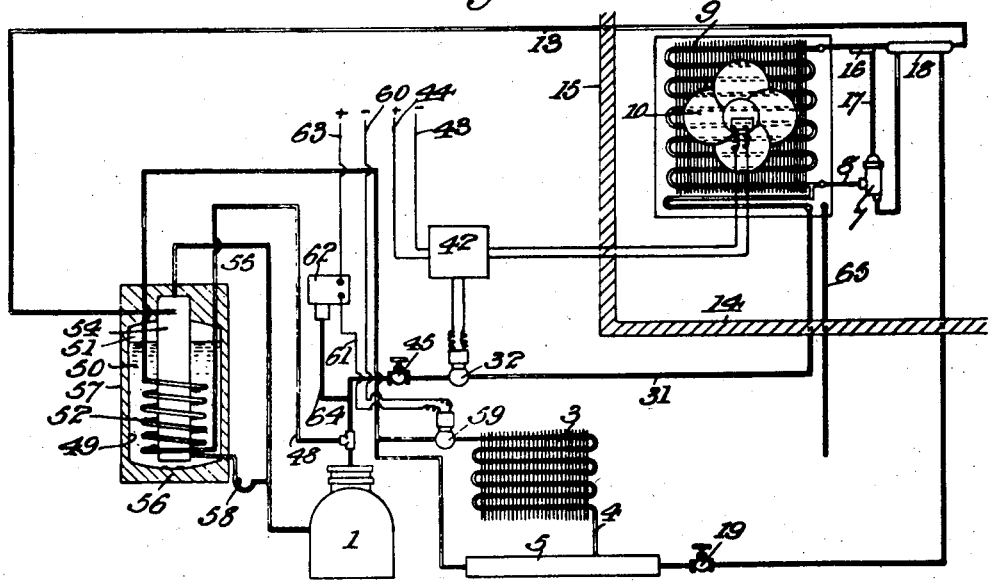

Patented Aug. 14, 1951

2,564,310

UNITED STATES PATENT OFFICE 2,564,310

MEANS FOR CONTROLLING THE HEAD PRESSURE IN REFRIGERATING SYSTEMS

Otto J. Nussbaum, Trenton, and Frank C. Obert, Nutley, N. J., assignors to Kramer Trenton Company, Trenton, N. J., a corporation of New Jersey Continuation of application Serial No. 756,050, June 20, 1947. This application October 5, 1950, Serial No. 188,522

18 Claims. (Cl. 62—3)

This invention relates to refrigerating apparatus and, more particularly, to means for controlling the head pressure in refrigerating systems in order to maintain the efficiency of the system and insure expeditious and thorough defrosting of the evaporator unit by hot gas supplied from the compressor.

This application is a continuation of application Serial Number 756,050, filed June 20, 1947, now abandoned.

An object of the invention is to assure efficiency in these systems or arrangements in which the condenser, particularly of the air-cooled or evaporative type, is located out of doors and subject to low ambient temperature as at geographical points where winters are severe.

Another object of the invention is to provide means for preventing, or materially reducing, the formation of vapor in the pipe line between the receiver and the evaporator, thereby insuring an adequate and substantially uniform supply of liquid refrigerant to the expansion valve, or its equivalent, and hence to the evaporator.

Another object is to provide means for preventing undesirable reduction in pressure at which the refrigerant is delivered to the expansion valve, or its equivalent, whereby efficiency of this part of the apparatus or system is maintained.

Another object is to provide means whereby the gas from the compressor may be caused wholly or partially to by-pass the condenser and travel directly to the receiver and thence, as liquid refrigerant, to the supply line for the evaporator.

Another object is to provide means for automatically regulating the flow of the hot gas from the compressor to the condenser.

Another object is to provide means for automatically regulating the flow of the hot gas from the compressor to the receiver through the by-pass line.

Another object is to provide means whereby the regulation of the flow of hot gas from the compressor to the condenser and/or through the by-pass to the receiver is controlled by a switch under the influence of the pressure in the head of the compressor.

Another object is to provide such a system in which a liquid accumulator is interposed in the suction line between the evaporator and the compressor.

A further object is to provide certain improvements in the form, construction, and arrangement of the parts, whereby the above named objects and other advantages inherent in the structure and mode of operation may be effectively attained.

Practical embodiments of the invention are diagrammatically represented in the accompanying drawings, in which Fig. 1 represents a known conventional type of refrigerating apparatus in which is embodied the hereinabove described means for causing the hot gas from the compressor to wholly or partially by-pass the condenser, said means being under manual control;

Fig. 2 represents a similar arrangement in which the flow of the hot gas to the condenser is automatically regulated by a solenoid valve under the control of a pressure switch that is activated by the head pressure in the compressor;

Fig. 3 represents a similar arrangement in which the flow of gas to the condenser is regulated by a modulating valve responsive to head pressure in the compressor; and in which the flow of gas from the compressor through the by-pass is regulated by a manually operable valve in the by-pass line;

Fig. 4 represents a similar arrangement which, however, includes a hot gas defrost line between the compressor and the evaporator; a liquid accumulator in the suction line between the evaporator and the compressor; a solenoid valve located in the said defrost line; and another solenoid valve in the line leading from the compressor to the condenser, said last named valve being under the control of a pressure switch that is activated by the head pressure in the compressor;

Fig. 5 represents an arrangement such as Fig. 4, but in which the solenoid valve is omitted from the gas line to the condenser and is located in the by-pass;

Fig. 6 represents the present invention as applied to refrigerating apparatus such as that disclosed in application for U. S. patent filed by Israel Kramer on November 7, 1944, under Serial No. 562,299, now Patent No. 2,440,146, dated April 20, 1948; a modulating valve being located in the gas line to the condenser; and Fig. 7 represents an arrangement like Fig. 6, but in which a solenoid valve is substituted for the modulating valve in the gas line to the condenser.

In connection with the installation of refrigerating apparatus it is sometimes desirable in view of building structure or arrangement to locate the compressor unit, including the condenser, out of doors, which is feasible when the condenser is of the air-cooled type. However, at geographical points where the temperature is normally low or where winters are severe, efficiency in operation of a refrigerating system thus installed, which employs a volatile refrigerant, is seriously handicapped when the ambient temperature at the condenser is below freezing, particularly with respect to proper supply of refrigerant to the evaporator and proper hot gas defrosting of the evaporator. The difficulty with respect to proper supply of refrigerant to the evaporator results chiefly from evaporation or boiling of the refrigerant in the pipe line leading to the evaporator which could take place as a result of too much loss of pressure in the line or too much increase of temperature surrounding the line at some point between the receiver and the expansion valve or its equivalent. This undesirable condition is likely also to affect the functioning of the expansion valve because of the flow of refrigerant to it at a greatly reduced pressure, and also because of the portion of the refrigerant that is in the form of vapor in the line. This vaporized portion of the refrigerant not only performs no useful function when passed by the expansion valve to the evaporator, but it also materially reduces the supply of liquid refrigerant due mainly to the fact that the vaporized form has a volume more than thirty times that of the liquid form and hence occupies a large part of the refrigerant liquid supply line. The difficulty with respect to hot gas defrosting of the evaporator, above mentioned, is especially unfortunate at times when the water vapor load from substances in the refrigerator is high at the evaporator while the temperature surrounding the condenser and compressor unit is low. This causes ice to form rapidly on the evaporator and there is not sufficient heat in the system to perform the defrosting step adequately because of the low temperature at the compressor unit. This undesirable condition is further more aggravated when the refrigerating system is, for one reason or another, subject to long periods during which the compressor is not in operation.

The present invention is calculated to eliminate the previously mentioned difficulties or disadvantages, as well as others which are encountered as a result of low temperature effects upon the condenser and compressor.

Referring now to the form of the invention illustrated in Fig. 1; a compressor, which may be of any well-known or approved form, is denoted by 1, and its discharge is connected by a suitable pipe or conduit 2 with an air-cooled or evaporative condenser 3, which latter may also be of any well-known or approved form. The condenser connects through a pipe 4 with a receiver 5, of any suitable form, which latter is connected by a pipe 6 with an expansion valve 7, that is connected by a pipe 8 with an evaporator 9 of any approved or desired construction. The usual fan 10 is mounted adjacent the evaporator for the purpose of circulating the chilled air, and it is provided with wires 11, 12 for bringing it into electrical contact with a suitable source of current (not shown) such, for instance, as a battery, generator or service supply line. From the evaporator 9 a suction pipe line 13 leads to the intake port of the compressor 1.

The evaporator, its fan, and the expansion valve are housed within a refrigeration chamber of any appropriate construction, two walls of which are marked 14, 15.

A feeler bulb 16 is associated with suction pipe 13 at a point adjacent the evaporator 9 and is connected by a small diameter pipe 17 with the expansion valve 7 for the purpose of regulating the action of the latter, all as is common practice and well understood in this industry.

The refrigerant feed pipe 6 and the suction pipe 13 both pass through a heat exchanger 18, which may be of well-known or approved construction, for the purpose of regulation of the temperature of the refrigerant being fed to the expansion valve and control of the relative temperature of the inflowing liquid refrigerant and outflowing vaporized refrigerant, all of which is again well understood and familiar practice in this field. Manually operable valve 19 is fitted in the pipe 6 for the purpose of controlling the flow of refrigerant from the receiver to the expansion valve.

The characteristic feature of the present invention as embodied in this form of Fig. 1 resides in the provision of a by-pass pipe or conduit 20 which opens into the pipe 2 at a point between the compressor 1 and condenser 3, and also opens into the pipe 4 at a point between the condenser 3 and the receiver 5. A manual valve 21 is fitted in the pipe 2 between the condenser and the point at which the by-pass 20 connects with the pipe 2.

In the operation of this form of the invention, when the temperature around the condenser 3 is so low as to cause sharp reduction in the head pressure at the compressor unit, the valve 21 may be closed so as to cause the hot gas from the compressor to by-pass, through pipe 20, the condenser and to flow directly to the receiver 5. In this condition, the receiver in effect becomes a condenser and the liquid refrigerant will flow therefrom to the expansion valve 7 under a pressure greater than would be the case if the gas were required to pass through condenser 3 before reaching receiver 5. As the demands in this respect may be expected to vary with different temperature conditions at the compressor-condenser unit and with different heat load conditions at the evaporator, the operator will find it desirable to modulate the flow of hot gas from the compressor by opening valve 21 to a greater or less extent so as to control the proportion of the gas which passes through the condenser and thereby maintain satisfactory head pressure for supplying adequate refrigerant in liquid form and under proper pressure to the expansion valve. It will be understood that, generally speaking, the valve 21 will be opened wider as the head pressure at the compressor increases and vice versa.

By either using the condenser 3 to its fullest extent, or cutting out the condenser and using the by-pass 20 to its fullest exent, or modulating the relative extent to which the condenser and by-pass are used for the flow of the gas from the compressor, satisfactory condensing pressure may be maintained under varying operative conditions so as to obviate the hereinabove mentioned difficulties arising from lowered pressure in the refrigerant feed line, vaporization or boiling of the refrigerant therein, and reduced supply and/or reduced pressure of the liquid refrigerant flowing to the expansion valve 7, and, hence, to the evaporator. Thus it is feasible to install refrigerating systems of this class with the compressor unit, including the condenser, located outside the building structure and subject to rigorous atmospheric conditions, without handicapping the refrigeration efficiency of the apparatus.

The modified form of the invention shown in diagrammatic detail in Fig. 2 is the same as that shown in Fig. 1, except that a solenoid valve automatically controlled by a pressure switch is substituted for the hand operated valve 21. The solenoid valve is denoted by 22 and may be of any well-known or approved form, several of which are obtainable on the market. One terminal of the valve 22 is electrically connected by a wire 23 with any suitable source of current, such as a battery (not shown); and its other terminal is connected by another wire 24 with one terminal of a pressure switch 25, the other terminal of which is connected by a wire 26 to the said source of current. The pressure switch may be of any well-known or approved form, of which a number are on the market, such, for instance, as one which includes a bellows subject to actuation by pressure, the bellows serving to operate a switch which controls the solenoid valve. The pressure switch is connected by a pipe 27 to the discharge pipe or conduit 2 of the compressor 1; and the arrangement is such that, when the head pressure at the compressor rises above a predetermined degree, the pressure switch 25 closes and completes the electric circuit through the valve 22 so as to open the latter. When the head pressure at the compressor falls below a predetermined degree, the pressure switch opens and permits the solenoid valve to close. It will be understood that the said pressure degrees at which the solenoid valve opens and closes may be fixed by the installing engineers to suit desired conditions.

A second modified form of the invention, the significant parts of which are shown in Fig. 3, is similar to the form shown in Fig. 2, except that a modulating valve is substituted for the solenoid valve 22 and its controlling pressure switch 25. The modulating valve is denoted by 28 and may be of any well-known or approved form. Such valves are obtainable on the market and serve to control the flow of fluid through conduits. In the present case the valve 28 is placed in the pipe 2 which leads from the discharge of the compressor to the condenser, and it is positioned in that part of pipe 2 which is intermediate the bypass pipe 20 and the condenser. A pipe 29 connects the compressor discharge pipe with the control of the valve 28 to regulate the operation of the latter so that, as the head pressure at the compressor rises, more of the hot gas will flow from the compressor to the condenser. This modified form of Fig. 3 also includes a hand valve 30 placed in the by-pass pipe 20 for the purpose of enabling the operator to regulate the size of the passage through the by-pass from fully open to fully closed. In this way, the automatic functioning of modulating valve 28, in response to pressure in pipe 29, may be supplemented by varying the amount of hot gas which is permitted to flow through the by-pass. It will be observed that this modified form of Fig. 3 varies functionally from the form of Fig. 2 in that the solenoid valve of the latter is either open or closed, while valve 28 of the form shown in Fig. 3 may be either open or closed or in any condition of partial opening therebetween.

The third modified form of the invention which is represented in Fig. 4 includes means for automatically defrosting the evaporator by the use of hot gas, the said means being controlled by a solenoid valve responsive to an electric timer, or other suitable device, for periodically actuating the said valve. This form of the invention also embodies the solenoid valve 22 of Fig. 2, which is located in the hot gas pipe 2 and controlled by pressure switch 25 that is responsive to head pressure in the compressor.

The hot gas defrosting means includes a pipe or conduit 31 which opens into the hot gas pipe 2 at a point between the compressor 1 and the by-pass 20, and runs to the evaporator coil. In the said pipe 31 is positioned a solenoid valve 32 which may be like valve 22 and has its terminals connected by wires 33, 34, with means for periodically opening the valve 32 such, for instance, as any well known or approved form of electric timer (not shown), a number of which are available in the open market. This timer may be set by the installing engineer to become active at certain times such, for instance, as every three hours, and to continue in action for predetermined periods such, for instance, as six minutes.

In the operation of this form of the invention, periodic opening of solenoid valve 32 by the timer will permit hot gas from the compressor to flow through pipe 31 to the evaporator for the purpose of accomplishing defrosting of the latter. The reduction in head pressure at the compressor following the opening of valve 32 will actuate switch 25 so as to close valve 22 and stop the flow of gas from the compressor to the condenser; and the expansion valve 7 will likewise close, thus insuring the full flow of hot gas through pipe 31 to the evaporator. The degrees of pressure at which switch 25 opens and closes may be predetermined and set by the installing engineer.

Another feature of this form of the invention shown in Fig. 4 consists in the provision of an accumulator, denoted by 35, which is placed in the suction pipe 13 that leads from the evaporator to the intake of the compressor. This accumulator may consist of a metallic tank or vessel with that portion of pipe 13 leading from the evaporator opening into the bottom of the accumulator and the part of the said pipe 13 which leads from the accumulator to the compressor opening into the top of the accumulator, as is clearly shown in Fig. 4. The function of this accumulator tank 35 is particularly in connection with the periodic defrostings of the evaporator. It will be understood that the hot gas which melts the ice on the evaporator coil during defrosting is in turn, by the chilling effect of the ice, condensed into a liquid which flows back through pipe 13 toward the compressor. As the inflow of this liquid into the compressor would seriously handicap the functioning of the latter, it is highly desirable to return the liquid to gaseous form before it reaches the compressor. This is accomplished by causing liquid to enter the lower part of the accumulator tank 35 and be vaporized therein before it is withdrawn therefrom by suction to the compressor. This vaporization will take place within the tank because refrigerant fluid is normally volatile, and such vaporization will be accelerated if any source of warmth, such, for instance, as sunlight, acts upon the accumulator.

The modified form of the invention represented in Fig. 5 is similar to that of Fig. 4, except that a solenoid valve is located in the by-pass 20 and no valve is placed in the pipe 2 running from the compressor to the condenser. This valve in by-pass 20 is marked 36 and is connected by wires 37, 38, 39, with a pressure switch 25* and a suitable source of electric current (not shown) as described in connection with valve 22 of Figs. 2 and 4. The switch is here marked 25* because, though similar to switch 25 of Figs. 2 and 4, its action is the reverse, i. e., it closes on low pressure and opens on high.

In the normal operation of this form of the invention the solenoid valve 32 is closed and the effect of by-pass 20 is automatically controlled by the valve 36 which is under the influence of switch 25* that is activated by the head pressure at the compressor. When the head pressure is low, the switch is closed and valve 36 is opened so as to permit the hot gas from the compressor to by-pass the condenser and flow directly to the receiver. When the head pressure is high the switch 25* is opened, the valve 36 is closed, and the hot gas from the compressor passes through the condenser to the receiver. The limits of pressure at which the switch 25* is closed and opened may be predetermined and set by the engineer. When a defrost period comes along, valve 32 is opened and the hot gas from the compressor passes to the evaporator through pipe 31 serving to melt the ice encrusting the evaporator coil. The defrost step condenses this gas which flows as a liquid to accumulator 35, is there vaporized, and then drawn into the compressor in the form of gas during continued operation of the system.

The form of the invention illustrated in Fig. 6 shows its application in connection with features of the invention disclosed in the above named U. S. patent application Serial No. 562,299; now Patent No. 2,440,146, dated April 20, 1948. In this form there is a modulating valve, denoted by 40, similar to the valve 28 shown in Fig. 3, which is positioned in the pipe leading from the compressor to the condenser, said valve being controlled by the head pressure at the compressor through a duct 41 that operates similarly to the element 29 shown in Fig. 3. The hot gas defrosting pipe line 31 runs directly from the compressor 1 to the evaporator 9, and is provided with solenoid valve 32, controlled by an electric timer, here shown and marked 42, as described in connection with the forms shown in Figs. 4 and 5 and as also set forth in the before mentioned U. S. Patent No. 2,440,146. The said timer is actuated from a suitable source of electric current (not shown) through wires 43 and 44. A hand valve 45 is fitted in the pipe 31 intermediate the compressor and the valve 32 to enable the said pipe to be manually closed if desired.

The hot gas discharge line leading from the compressor is here marked 46, and it runs to a T-coupling 47 from which another pipe 48 extends to and enters at the top of a vessel or container 49 which may be composed of any suitable material, such as sheet steel, and is largely but not entirely filled with a suitable liquid 50 such, for instance, as a solution of alcohol and water or Prestone and water; whereby a space 51 remains above the liquid 50 in the vessel 49. The pipe 48 is arranged in the form of a coil 52 in the lower part of the vessel 49 and then extends upwardly through the top of the vessel and leads to the receiver 5 and, by a branch pipe 53, to the condenser 3. It is in this branch pipe that the modulating valve 40 is positioned. It will thus be seen that, in this form of the invention, as in the previously described forms, the hot gas from the compressor can flow directly to the condenser, or directly to the receiver, or partly to the condenser and partly to the receiver.

The suction pipe 13 from the evaporator leads into the upper part of a tank 54 which is located within the vessel 49 so as to be surrounded by the liquid 50 therein and extends upwardly through the top of the said vessel. From the top of the tank 54 a continuation of the suction pipe, marked 55, extends to the intake port of the compressor. The tank 54 is composed of suitable material, such as sheet steel, while it and the vessel 49 are surrounded by an appropriate heat-cold insulating material 56 which is confined within a surrounding casing 57 that may be composed of any desired material, such as steel or iron. Any appropriate means (not shown) may be provided for supporting the bottom of the tank 54 within the vessel 49; and a pipe 58, preferably of small diameter, connects the bottom of tank 54 with suction pipe 55 at a point near the compressor for the purpose of draining off any oil which may accumulate in tank 54. For this purpose, the bottom of tank 54 is preferably located higher than the intake or suction port of the compressor.

In the operation of this form of the invention, the hot gas from the compressor passes through the coil 52 and heats the liquid 50, which, in turn, heats the tank 54. The hot gas passing through coil 52 continues through pipe 48 to the condenser 3 and/or receiver 5 according to the condition of modulating valve 40, as hereinabove described. When the electric timer 42 is actuated to perform a defrosting of the evaporator, valve 32 is opened and the hot gas from the compressor flows through pipe 31 to the evaporator to melt the ice thereon. In performing this function, the effect of the ice is to condense the hot gas so that it leaves the evaporator in the form of a liquid which passes through pipe 13 and enters tank 54. The heat of the tank vaporizes the fluid so that it may be drawn as a gas through pipe 55 to the intake of the compressor. At the end of the defrosting period, electric timer 42 closes valve 32, and the normal operation of supplying refrigerant to the evaporator resumes.

The form of the invention shown in Fig. 7 is the same as that of Fig. 6 except that a solenoid valve, here marked 59, is substituted for modulating valve 40. One terminal of valve 59 is connected by wire 60 with any suitable source of electric current, such as a battery (not shown), and the other terminal of the said valve is connected by a wire 61 with one terminal of a pressure switch 62, the other terminal of which is connected by a wire 63 with the said source of electric current. Switch 62 is connected by pipe 64 with hot gas pipe 31 so as to be activated by the head pressure at the compressor. When the head pressure rises to a certain predetermined degree, the switch 62 closes and valve 59 is thereby opened. When the head pressure declines to a certain predetermined degree, the switch opens and the valve closes. The said high and low pressure points serving to actuate the switch may be decided upon and set by the installing engineer.

The operation of this form of the invention is the same as the form shown in Fig. 6, except that the action of valve 59 is to either open or close the hot gas line leading to the condenser; while the action of valve 40 in the form shown in Fig. 6 is to either wholly or partially open or close the said hot gas line and thereby modulate the flow of gas to the compressor.

In all the forms of the invention, the evaporator is provided with a suitable drain pipe 65, for leading the melted ice water to the sewer or other suitable disposal point. It should also be stated that, in all the forms of the invention, the cross section of the by-pass pipe 20 should be so small as to prevent substantial by-passing of refrigerant therethrough when the valve in the hot gas line leading to the condenser is open. This is because, when the friction pressure drop of the condenser is relatively high and that of the bypass relatively low, the condenser might not function as a heat transfer device because of the major portion of the hot gas flowing through the by-pass, thus causing excessively high head pressure with the result that sufficient liquid refrigerant might back from the receiver into the condenser to flood the latter and render it largely or wholly inoperative to perform its said function. Instead of insuring proper operation in this respect by selecting the correct diameter of the by-pass pipe for each installation, a hand valve, such as the valve 30 shown in Fig. 3, may be set in the by-pass and be adjusted so as, in effect, to throttle the by-pass to the desired extent for insuring proper functional operation of the condenser.

With particular reference to the form of the invention shown in Fig. 3, we have found the modulating valve 28 to be so efficient that it is possible to eliminate the by-pass 20 while maintaining satisfactory functioning of the system.

With particular reference to the forms of the invention represented in Figs. 4 to 7 inclusive, it may be mentioned that the electric circuit is usually arranged so as to stop the evaporator fan 10 during defrosting periods and to restart the fan at the end of each defrosting period.

Again, it should be noted that there is no functional difference in the operation of the apparatus whether the condenser by-pass is connected to the outlet of the condenser, as shown in Figs. 1, 2, 3, 4 and 5, or directly to the receiver as shown in Figs. 6 and 7.

It will be seen from the foregoing that this invention is calculated to eliminate the difficulties and disadvantages outlined in the forepart of this specification, as well as to attain the objects and advantages mentioned together with others that are inherent in the structures and their arrangement and mode of operation.

It will also be understood that various changes may be resorted to in the form, construction and arrangement of the several parts without departing from the spirit and scope of the invention, and hence we do not intend to be limited to details herein shown or described except as they may be embodied in the claims or required by the disclosures of the prior art.

What we claim is:

1. Apparatus of the character described comprising, a compressor, a condenser, an expansion valve, an evaporator, a liquid refrigerant supply line connecting the condenser with the expansion valve, a refrigerant supply conduit connecting the expansion valve with the evaporator, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the supply line to the expansion valve and by-passing the condenser, and a valve responsive to head pressure at the compressor located in the conduit connecting the compressor with the condenser for restricting to a greater or less extent the flow of refrigerant to the condenser.

2. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, and means for restricting the flow of refrigerant through at least one of said two last named conduits.

3. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, and means for automatically restricting the flow of refrigerant through at least one of said two last named conduits.

4. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, and means for closing at least one of said two last named conduits against the flow of refrigerant therethrough.

5. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, and means for automatically closing at least one of said two last named conduits against the flow of refrigerant therethrough.

6. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, and means for regulating the proportions of refrigerant flow through said two last named conduits.

7. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, and means for automatically regulating the proportions of refrigerant flow through said two last named conduits.

8. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, and a valve responsive to head pressure at the compressor located in said last named conduit for restricting to a greater or less extent the flow of refrigerant to the condenser.

9. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, and a modulating valve responsive to head pressure at the compressor located in said last named conduit for restricting to a greater or less extent the flow of refrigerant to the condenser.

10. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, and a valve located in the conduit connecting the discharge of the compressor with the condenser for restricting to a greater or less extent the flow of refrigerant to the condenser.

11. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, and a valve located in said last named conduit for restricting to a greater or less extent the flow of refrigerant to the receiver.

12. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, and valves in said two last named conduits for restricting to a greater or less extent the flow of refrigerant therethrough.

13. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, and valves in said two last named conduits for restricting to a greater or less extent the flow of refrigerant therethrough, the valve in the conduit connecting the compressor with the condenser being responsive to head pressure at the compressor.

14. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, means for restricting the flow of refrigerant through at least one of said two last named conduits, and a conduit connecting the discharge of the compressor with the evaporator for defrosting the latter by hot gas supplied from the former.

15. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, means for restricting the flow of refrigerant through at least one of said two last named conduits, and an element in the conduit connecting the evaporator with the compressor for accumulating the refrigerant and vaporizing it before its return to the compressor.

16. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, means for restricting the flow of refrigerant through at least one of said two last named conduits, a conduit connecting the discharge of the compressor with the evaporator for defrosting the latter by hot gas supplied from the former, and an element in the conduit connecting the evaporator with the compressor for accumulating the refrigerant and vaporizing it before its return to the compressor.

17. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, means for restricting the flow of refrigerant through at least one of said two last named conduits, an element in the conduit connecting the evaporator with the compressor for accumulating the refrigerant and vaporizing it before its return to the compressor, and means for conducting hot gas from the compressor discharge into heat exchange relation with said accumulator to heat the latter and hasten the vaporizing of the refrigerant flowing from the evaporator.

18. Apparatus of the character described comprising, a compressor, a condenser, a receiver connected with the condenser to receive refrigerant therefrom, an evaporator, a conduit connecting the receiver with the evaporator for supplying refrigerant to the latter, a conduit connecting the evaporator with the compressor for returning refrigerant to the latter, a conduit for the flow of refrigerant connecting the discharge of the compressor with the condenser, a conduit for the flow of refrigerant connecting the discharge of the compressor with the receiver, means for restricting the flow of refrigerant through at least one of said two last named conduits, a conduit connecting the discharge of the compressor with the evaporator for defrosting the latter by hot gas supplied from the former, an element in the conduit connecting the evaporator with the compressor for accumulating the refrigerant and vaporizing it before its return to the compressor, and means for conducting hot gas from the compressor discharge into heat exchange relation with said accumulator to heat the latter and hasten the vaporizing of the refrigerant flowing from the evaporator.

OTTO J. NUSSBAUM.
FRANK C. OBERT.

REFERENCES CITED

The following references are of record in the file of this patent and in the parent case:

UNITED STATES PATENTS

| Number | Name | Date |
| --- | --- | --- |
| 2,252,300 | McGrath | Aug. 12, 1941 |
| 2,344,215 | Soling et al. | Mar. 14, 1944 |
| 2,363,273 | Waterfill | Nov. 21, 1944 |
| 2,403,818 | McGrath | July 9, 1946 |
| 2,440,146 | Kramer | Apr. 20, 1948 |